(12) United States Patent
Yamamoto et al.

(10) Patent No.: US 12,240,389 B2
(45) Date of Patent: Mar. 4, 2025

(54) WIRING MEMBER

(71) Applicant: Sumitomo Wiring Systems, Ltd., Yokkaichi (JP)

(72) Inventors: Hironobu Yamamoto, Yokkaichi (JP); Toshinari Kobayashi, Yokkaichi (JP); Kyungwoo Kim, Yokkaichi (JP); Futa Asano, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 171 days.

(21) Appl. No.: 18/000,604

(22) PCT Filed: May 18, 2021

(86) PCT No.: PCT/JP2021/018812
§ 371 (c)(1),
(2) Date: Dec. 2, 2022

(87) PCT Pub. No.: WO2021/246162
PCT Pub. Date: Dec. 9, 2021

(65) Prior Publication Data
US 2023/0211743 A1   Jul. 6, 2023

(30) Foreign Application Priority Data

Jun. 3, 2020 (JP) ................................. 2020-096799

(51) Int. Cl.
*B60R 16/02*  (2006.01)
*H01B 7/00*   (2006.01)
*H01B 7/40*   (2006.01)

(52) U.S. Cl.
CPC ....... *B60R 16/0215* (2013.01); *H01B 7/0045* (2013.01); *H01B 7/40* (2013.01)

(58) Field of Classification Search
CPC .... B60R 16/0215; H02G 3/04; H02G 3/0468; H01B 7/40; H01B 7/0045
See application file for complete search history.

(56) References Cited

U.S. PATENT DOCUMENTS 4,615,574 A * 10/1986 Dearman ............... H01R 43/00
439/750
5,380,224 A *  1/1995 DiCicco ........... H01R 13/65915
439/447

(Continued)

FOREIGN PATENT DOCUMENTS

JP    2011-023267 A    2/2011
JP    2019-196062 A   11/2019

OTHER PUBLICATIONS

International Search Report, Application No. PCT/JP2021/018812, mailed Aug. 3, 2021. ISA/Japan Patent Office.

*Primary Examiner* — Paresh Paghadal
(74) *Attorney, Agent, or Firm* — Honigman LLP (57) ABSTRACT

A wiring member includes: a linear transmission member that includes an electric wire; a connector housing; an outer armor member; and a cover member that is provided between the connector housing and the outer armor member in a lengthwise direction of the electric wire, and attached to an outer circumferential portion of the linear transmission member. The cover member and the linear transmission member are relatively movable in the lengthwise direction of the electric wire, and the connector housing and the outer armor member restrict a movement of the cover member in the lengthwise direction of the electric wire. The cover member is an elastic member, and includes an elastic cylindrical portion that is compression-deformable in a lengthwise direction of the cover member.

20 Claims, 3 Drawing Sheets

(56) References Cited

U.S. PATENT DOCUMENTS

| | | | |
|---|---|---|---|
| 6,162,087 A | 12/2000 | Hiura | |
| 2004/0029433 A1* | 2/2004 | Lee | H01R 24/564 |
| | | | 439/445 |
| 2005/0148212 A1* | 7/2005 | Ojima | B60R 16/0215 |
| | | | 439/34 |
| 2006/0252292 A1* | 11/2006 | Sonderegger | F16L 53/38 |
| | | | 439/191 |
| 2008/0142637 A1 | 6/2008 | Lesage et al. | |
| 2011/0124035 A1* | 5/2011 | Broadley | C12M 23/28 |
| | | | 435/29 |
| 2011/0297440 A1* | 12/2011 | Gibbs | H02G 3/0468 |
| | | | 174/70 R |
| 2013/0209042 A1* | 8/2013 | Belenkiy | G02B 6/3885 |
| | | | 385/77 |
| 2019/0244730 A1* | 8/2019 | Kushima | H02G 3/22 |
| 2019/0375351 A1 | 12/2019 | Adachi | |
| 2022/0105884 A1* | 4/2022 | Maxted | B60R 16/0215 |

\* cited by examiner

FIG. 5

WIRING MEMBER

CROSS-REFERENCE TO RELATED APPLICATIONS

This application is the U.S. national stage of PCT/JP2021/018812 filed on May 18, 2021, which claims priority of Japanese Patent Application No. JP 2020-096799 filed on Jun. 3, 2020, the contents of which are incorporated herein.

TECHNICAL FIELD

The present disclosure relates to a wiring member.

BACKGROUND

JP H10-294146A discloses a rubber boot that covers a rear end portion of a connector housing and an electric wire that extends from the connector housing. In JP H10-294146A, a pressure sensitive tape is wound around the electric wire and the rubber boot to attach the rubber boot to a predetermined position.

However, the tape winding process takes time and effort. In addition, the rubber boot may be displaced when the pressure sensitive adhesion of the pressure sensitive tape weakens due to degradation over time. For these reasons, there has been a need for a method for attaching the rubber boot without winding the tape. Furthermore, when attaching the rubber boot after the connector housing has been provided to the end portion of the electric wire, a process of passing the connector housing through the rubber boot is required. Accordingly, there has also been a need for a method for passing the electric wire through the rubber boot prior to the connector housing is provided to the end portion of the electric wire.

To address the foregoing, it is an object of the present disclosure to provide a technique, with which a cover member can be attached without winding a tape, and a connector housing can be provided to an end portion of an electric wire after the electric wire has been passed through the cover member.

SUMMARY

A wiring member according to the present disclosure is a wiring member including: a linear transmission member that includes an electric wire; a connector housing in which an end portion of the electric wire in a lengthwise direction of the electric wire is housed; an outer armor member that is provided in an intermediate portion in the lengthwise direction of the electric wire, and fixed to an outer circumferential portion of the linear transmission member; and a cover member that is provided between the connector housing and the outer armor member in the lengthwise direction of the electric wire, and attached to the outer circumferential portion of the linear transmission member, wherein the cover member and the linear transmission member are relatively movable in the lengthwise direction of the electric wire, and the connector housing and the outer armor member restrict a movement of the cover member in the lengthwise direction of the electric wire, and the cover member is an elastic member, and includes an elastic cylindrical portion that is compression-deformable in a lengthwise direction of the cover member.

Advantageous Effects of Invention

According to the present disclosure, it is possible to attach a cover member without winding a tape, and provide a connector housing to an end portion of an electric wire after the electric wire has been passed through the cover member.

DETAILED DESCRIPTION OF PREFERRED EMBODIMENTS

First, aspects of an embodiment according to the present disclosure will be listed and described.

A wiring member according to the present disclosure is as follows.

First Aspect

In accordance with a first aspect, a wiring member includes: a linear transmission member that includes an electric wire; a connector housing in which an end portion of the electric wire in a lengthwise direction of the electric wire is housed; an outer armor member that is provided in an intermediate portion in the lengthwise direction of the electric wire, and fixed to an outer circumferential portion of the linear transmission member; and a cover member that is provided between the connector housing and the outer armor member in the lengthwise direction of the electric wire, and attached to the outer circumferential portion of the linear transmission member, wherein the cover member and the linear transmission member are relatively movable in the lengthwise direction of the electric wire, and the connector housing and the outer armor member restrict a movement of the cover member in the lengthwise direction of the electric wire, and the cover member is an elastic member, and includes an elastic cylindrical portion that is compression-deformable in a lengthwise direction of the cover member. The cover member and the linear transmission member are relatively movable in the lengthwise direction of the electric wire, and the connector housing and the outer armor member restrict the movement of the cover member in the lengthwise direction of the electric wire, and thus a state in which the cover member is attached to a predetermined position can be maintained without winding a tape. Also, the cover member is an elastic member, and includes an elastic cylindrical portion that is compression-deformable in the lengthwise direction of the cover member, and thus even after the cover member has been attached to the electric wire, the end portion of the electric wire can be easily processed by compression-deforming the elastic cylindrical portion.

Second Aspect

In a second aspect, the wiring member according to the first aspect, when the cover member moves toward the connector housing in the lengthwise direction of the electric wire, a first contact portion that is provided at one end portion of the cover member may come into contact with a connector housing-side contact portion of the connector housing and restrict the movement of the cover member, and when the cover member moves toward the outer armor member in the lengthwise direction of the electric wire, a second contact portion that is provided at the other end portion of the cover member may come into contact with an outer armor member-side contact portion of the outer armor member and restrict the movement of the cover member. A natural length of the cover member from the first contact portion to the second contact portion may be equal to or longer than a length from the connector housing-side contact portion to the outer armor member-side contact portion. With this configuration, the cover member hardly moves in the lengthwise direction of the electric wire.

Third Aspect

In a third aspect, the wiring member according to the second aspect, the natural length of the cover member from the first contact portion to the second contact portion may be longer than the length from the connector housing-side contact portion to the outer armor member-side contact portion. With this configuration, opposite end portions of the cover member are pressed by the connector housing and the outer armor member. Accordingly, the cover member is unlikely to rattle.

Fourth Aspect

In a fourth aspect, the wiring member according to any of the first to third aspects, the elastic cylindrical portion may be formed in a bellows shape in which large-diameter portions and small-diameter portions are alternately provided in a continuous manner in the lengthwise direction, in the elastic cylindrical portion, a diameter enlarged portion may be provided between each pair of a small-diameter portion and a large-diameter portion that are adjacent to each other, the diameter enlarged portion being a portion whose diameter is gradually enlarged from the small-diameter portion toward the large-diameter portion, and in a state in which the elastic cylindrical portion is compression-deformed, the diameter enlarged portion may be inclined at a higher angle, and adjacent large-diameter portions may come closer to each other. With this configuration, the shape of the elastic cylindrical portion can be easily compression-deformed.

Fifth Aspect

In a fifth aspect, the wiring member according to any of the first to fourth aspects, the cover member may further include a cylindrical holding portion that is less likely to be compression-deformed than the elastic cylindrical portion, and the cylindrical holding portion may be provided at a position adjacent to the elastic cylindrical portion on the outer armor member side. With this configuration, the cover member and the outer armor member are likely to come into contact with each other in an appropriate orientation.

Sixth Aspect

In a sixth aspect, the wiring member according to the fifth aspect, when the cover member is in a natural length state, the elastic cylindrical portion may be longer than the cylindrical holding portion. With this configuration, the length of the elastic cylindrical portion that is compression-deformable can be extended.

Seventh Aspect

In a seventh aspect, the wiring member according to the fifth or sixth aspects, the cover member may further include an annular protruding portion that protrudes from an inner surface of the cylindrical holding portion toward the linear transmission member, and the annular protruding portion may be in contact with the outer circumferential portion of the linear transmission member. With this configuration, it is possible to prevent water and the like from entering between the cylindrical holding portion and the linear transmission member.

Eighth Aspect

In an eighth aspect, the wiring member according to the seventh aspect, the linear transmission member may include a plurality of electric wires, at a position where the annular protruding portion is provided, the plurality of electric wires may be covered with a protective portion that has an annular outer surface, and the annular protruding portion may be in contact with the outer surface of the protective portion. With this configuration, a gap is unlikely to be formed between the annular protruding portion and the protective portion that has an annular outer surface.

Ninth Aspect

In a ninth aspect, the wiring member according to any of the first to eighth aspects, the linear transmission member may include a plurality of electric wires as the electric wire and a sheath that covers the plurality of electric wires, portions of the plurality of electric wires including end portions of the plurality of electric wires that are housed in the connector housing may extend from an end portion of the sheath, and the end portion of the sheath may be located within the cover member. With this configuration, the portions of the plurality of electric wires that are not covered with the sheath are covered with the cover member. Also, the outer armor member side-end portion of the cover member is located in a portion where the sheath is provided.

A specific example of a wiring member according to the present disclosure will be described below with reference to the drawings. It is to be noted that the present disclosure is not limited to the example given below, and the scope of the present disclosure is indicated by the appended claims, and all changes that come within the meaning and range of equivalency of the claims are intended to be embraced within the scope of the present disclosure.

Embodiment 1

Figure 1:
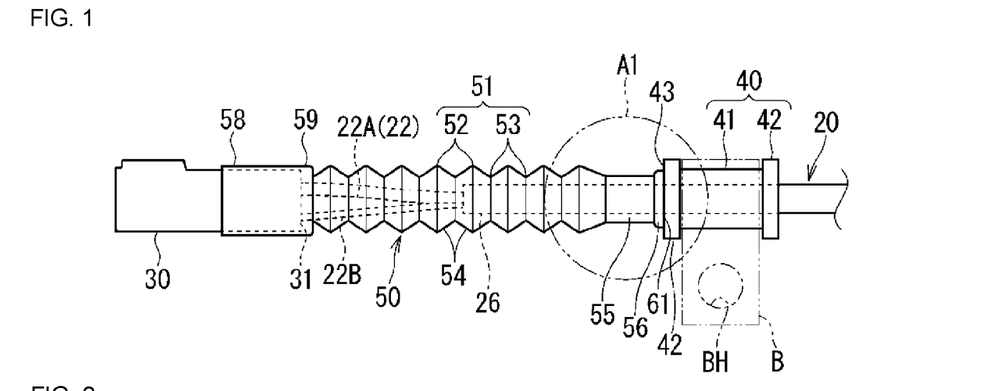
FIG. 1 is a side view of a wiring member according to Embodiment 1.
Figure 2:
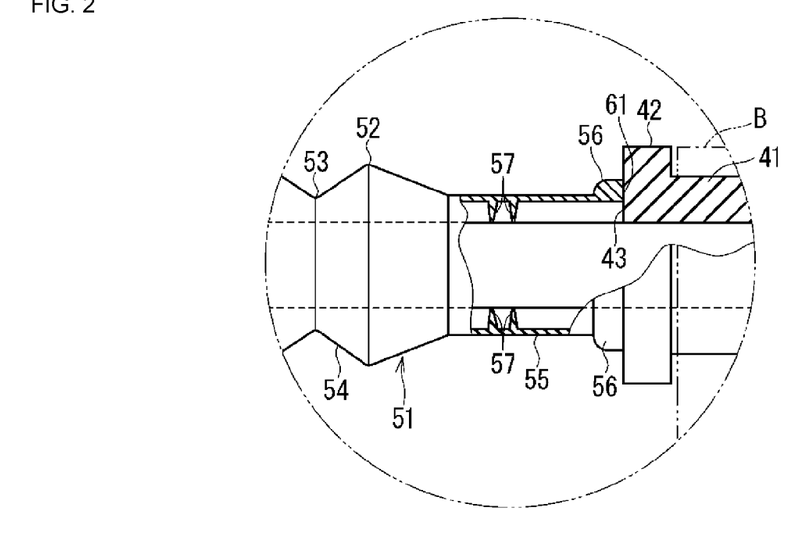
FIG. 2 is an enlarged view of a region A1 shown in FIG. 1.

Hereinafter, a wiring member 10 according to Embodiment 1 will be described. FIG. 1 is a side view of the wiring member 10 according to Embodiment 1. FIG. 2 is an enlarged view of a region A1 shown in FIG. 1. In FIG. 2, a cross-sectional view of a portion of an outer armor member 40 and a portion of a cover member 50 is shown.

The wiring member 10 connects devices in a vehicle and transmits electricity or light. The wiring member 10 may be provided anywhere in the vehicle. In this example, a description will be given assuming that the wiring member 10 is a wiring member 10 for a suspension of a vehicle that connects a vehicle-side device and a device that is included in the suspension. FIG. 1 shows a portion of the wiring member 10 including an end portion of the wiring member 10 that is connected to the device that is included in the suspension. The wiring member 10 includes a linear transmission member 20, a connector housing 30, an outer armor member 40, and a cover member 50.

Linear Transmission Member

The linear transmission member 20 is a linear member that transmits electricity or light. In this example, the linear transmission member 20 includes an electric wire 22. The electric wire 22 includes a core wire 23 and a coating 24 (see FIG. 4). The core wire 23 is a linear member formed using a metal wire made of copper, a copper alloy, aluminum, an aluminum alloy, or the like. The core wire 23 may be a single strand or a twisted wire obtained by twisting a plurality of strands together. The coating 24 is an insulating portion that covers the core wire 23. The coating 24 is formed by, for example, extrusion-coating a resin around the core wire 23. The linear transmission member may also include an optical fiber that transmits an optical signal.

The linear transmission member 20 may include only a single electric wire 22, or may include a plurality of electric wires 22. In this example, the linear transmission member 20 includes a plurality of (four in this example) electric wires 22. The linear transmission member 20 further includes a sheath 26 that covers the plurality of electric wires 22. The sheath 26 is formed using a resin or the like. The sheath 26 is formed by, for example, extrusion-coating a resin around the plurality of electric wires 22.

The electric wire 22 may serve as a signal line or a power line. For example, in the case where the wiring member 10 is a wiring member for a suspension, the electric wire 22 may serve as a power supply line that supplies power to an EPB (Electric Parking Brake) or an EMB (Electro-Mechanical Brake System). For example, in the case where the wiring member 10 is a wiring member for a suspension, the electric wire 22 may serve as a signal line of an ABS (Anti-Lock Brake System), the signal line being for transmitting a signal from a sensor for detecting the speed of wheels. The wiring member 10 may also be used as a composite harness that includes a plurality of types of electric wires 22. As described above, in the case where the wiring member 10 includes an electric wire 22 that serves as a power supply line and an electric wire 22 that serves as a signal line, the wiring member 10 is a composite harness. In particular, in the case where the wiring member 10 includes a power supply line for an electric brake and a signal line for detecting the vehicle speed, the wiring member 10 is a composite harness for a brake.

Two electric wires 22A out of the four electric wires 22 serve as EPB power supply lines. The other two electric wires 22B out of the four electric wires 22 serve as ABS sensor signal lines. The number of electric wires 22 in the linear transmission member 20 is not limited thereto, and may be any number. For example, the linear transmission member 20 may include six electric wires. Four electric wires out of the six electric wires serve as EPB power supply lines and ABS sensor signal lines, and the remaining two electric wires may serve as power supply lines for other devices that are included in the suspension of the vehicle such as the EMB, or signal lines for controlling other sensors or other devices that are included in the suspension of the vehicle.

Portions at one end of each of the plurality of electric wires 22 are all housed in the same connector housing 30. Portions of the plurality of electric wires 22 including the portions at one end of each of the plurality of electric wires 22 that are housed in the connector housing 30 extend from one end portion of the sheath 26. The one end portion of the sheath 26 and the connector housing 30 are spaced apart from each other in the lengthwise direction of the linear transmission member 20.

Connector Housing

The portions at one end of each of the electric wires 22 extending in the lengthwise direction of the electric wires 22 are housed in the connector housing 30. The connector housing 30 is formed in, for example, a rectangular parallelepiped outer shape. The connector housing 30 includes a cavity. The cavity extends through the connector housing 30. One opening portion of the cavity is formed in a rear end face 31 of the connector housing 30. The rear end face 31 is formed in, for example, a rectangular shape, a square shape, or the like. The one end portions of the electric wires 22 are inserted into the cavity from the one opening portion of the cavity. For example, terminals T are provided to the portions at one end of each of the electric wires 22 (see FIG. 4). The terminals T and the portions of the electric wires 22 that are connected to the terminals T are housed in the cavity. The other end portions of the electric wires 22 that are opposite to the portions of the electric wires 22 that are connected to the terminals T extend to the outside of the cavity. The terminals T may be male terminals or female terminals.

Outer Armor Member

The outer armor member 40 is provided at an intermediate portion of the electric wires 22 in the lengthwise direction. The outer armor member 40 is fixed to the outer circumferential portion of the linear transmission member 20. The outer armor member 40 may be provided for any application. In this example, the outer armor member 40 is used as a fixing member attachment portion 40. The fixing member attachment portion 40 is a portion that serves as a base between the linear transmission member 20 and a fixing member B when the linear transmission member 20 is fixed to the fixing member B. In this example, the fixing member attachment portion 40 includes a main body portion 41 and ribs 42. The main body portion 41 and the ribs 42 have, for example, an annular shape. Each rib 42 extends from the main body portion 41 toward the outer circumferential side. The fixing member B is provided to the outer circumferential portion of the main body portion 41. The ribs 42 are respectively provided at positions adjacent to the main body portion 41 in the lengthwise direction of the linear transmission member 20. The ribs 42 prevent the fixing member B from being displaced in the lengthwise direction of the linear transmission member 20 or detached from the main body portion 41.

Of course, the outer armor member 40 does not necessarily need to serve as the fixing member attachment portion 40. For example, the outer armor member 40 may be the fixing member B. That is, in the wiring member 10, the fixing member attachment portion 40 may be omitted, and the fixing member B may be fixed directly to an outer surface of the linear transmission member 20. Alternatively, for example, the outer armor member may be a branch maintaining portion. The branch maintaining portion is provided at branched portions of the plurality of electric wires 22 to maintain the branched shape.

The outer armor member 40 may be provided to the outer circumferential portion of the electric wires 22 using any configuration. For example, the outer armor member 40 may be a resin molded portion. Alternatively, for example, the outer armor member 40 may be a separate molded article molded separately from the linear transmission member 20. In the case where the outer armor member 40 is a separate molded article, the outer armor member 40 may be a protector or the like.

The resin molded portion is insert-molded using the linear transmission member 20 as an insert component. In the case where the outer armor member 40 is a resin molded portion, an intermediate portion of the linear transmission member 20 in the lengthwise direction is embedded in the resin molded portion, and the outer armor member 40 is fixed to the linear transmission member 20. In the case where the outer armor member 40 is a resin molded portion, preferably, the resin of the resin molded portion and the resin of the outer circumferential portion of the linear transmission member 20 are directly bonded to each other.

In the case where the outer armor member 40 is a separate molded article, the material of the outer armor member 40 is set as appropriate according to the application of the outer armor member 40. For example, in the case where the outer armor member 40 serves as the fixing member attachment portion 40 or the branch maintaining portion, the outer armor member 40 may be a molded article formed using a resin, a rubber, or the like. For example, in the case where the outer armor member 40 serves as the fixing member B, the outer armor member 40 may be a molded article formed using a metal, a resin, or the like.

In the case where the outer armor member 40 is a separate molded article, a fixing portion that fixes the outer armor member 40 to the outer circumferential portion of the linear transmission member 20 may be provided in the wiring member 10. The fixing portion can be anything, but may be, for example, an adhesive, a pressure sensitive tape, or the like.

In this example, the fixing member B is a member for fixing the wiring member 10 to the vehicle. The fixing member B may be, for example, a bracket B. The bracket B is formed in a plate shape using a resin or a metal. A through hole BH is formed in the bracket B. The bracket B is fixed to the vehicle as a result of a bolt that has passed through the through hole BH being fastened to an attachment portion on the vehicle side. The bracket B may be fixed to the fixing member attachment portion 40 through clamping. When the fixing member attachment portion 40 is insert-molded using the linear transmission member 20 as an insert component, the bracket B may also be used as an insert component. In this case, a portion of the bracket B is embedded in the fixing member attachment portion 40.

A front end face 43 of the outer armor member 40 that is provided on the connector housing 30 side is in contact with an end face 61 of the cover member 50 on the other end side. The front end face 43 is flat. Also, the inner edge of the front end face 43 is circular, and the diameter thereof (the inner diameter of the outer armor member 40 at the front end face 43) is the same as the outer diameter of the linear transmission member 20 (in this example, the outer diameter of the sheath 26). Also, the outer edge of the front end face 43 is circular, the diameter thereof (the outer diameter of the outer armor member 40 at the front end face 43) is larger than the outer diameter of the cover member 50. The outer diameter of the outer armor member 40 at the front end face 43 is larger than the sum of a gap between the cover member 50 and the linear transmission member 20 (the difference between the inner diameter of the cover member 50 and the outer diameter of the linear transmission member 20) and the outer diameter of the end face 61 of the cover member 50.

Cover Member

The cover member 50 is provided between the connector housing 30 and the outer armor member 40 in the lengthwise direction of the electric wires 22. The cover member 50 is attached to the outer circumferential portion of the linear transmission member 20. The cover member 50 and the linear transmission member 20 are relatively movable in the lengthwise direction. The cover member 50 is not fixed to the linear transmission member 20 with a pressure sensitive tape or the like. The connector housing 30 and the outer armor member 40 restrict the movement of the cover member 50 in the lengthwise direction of the linear transmission member 20. With this configuration, in the wiring member 10, the cover member 50 is positioned at a predetermined position. The cover member 50 is an elastic member formed using, as the material, an elastomer such as a rubber. The cover member 50 includes an elastic cylindrical portion 51. In this example, the cover member 50 further includes a cylindrical holding portion 55, an annular protruding portion 57, and a connector cover portion 58.

The elastic cylindrical portion 51 is compression-deformable in the lengthwise direction of the elastic cylindrical portion 51. Hereinafter, the length of the elastic cylindrical portion 51 when the elastic cylindrical portion 51 is in a natural state may be referred to simply as "the natural length". The elastic cylindrical portion 51 is formed in a bellows shape in which large-diameter portions 52 and small-diameter portions 53 are alternately provided in a continuous manner in the lengthwise direction. The large-diameter portions 52 are portions of the elastic cylindrical portion 51 with the largest diameter. The small-diameter portions 53 are portions of the elastic cylindrical portion 51 with the smallest diameter. In the elastic cylindrical portion 51, a diameter enlarged portion 54 is provided between each pair of a small-diameter portion 53 and a large-diameter portion 52 that are adjacent to each other. The diameter enlarged portion 54 is a portion whose diameter is gradually enlarged from the small-diameter portion 53 toward the large-diameter portion 52. In the elastic cylindrical portion 51, the large-diameter portions 52, the small-diameter portions 53, and the diameter enlarged portions 54 have about the same thickness. In a state in which the elastic cylindrical portion 51 is compression-deformed, the diameter enlarged portions 54 are inclined at a higher angle than those in a state in which the elastic cylindrical portion 51 has the natural length, and thus adjacent large-diameter cylindrical portions come closer to each other.

In this example, in the state in which the elastic cylindrical portion 51 has the natural length, the diameter enlarged portions 54 are provided continuously between each pair of a small-diameter portion 53 and a large-diameter portion 52 that are adjacent to each other in the lengthwise direction. That is, intermediate-diameter portions are not provided continuously between each pair of a small-diameter portion 53 and a large-diameter portion 52 that are adjacent to each other. In this example, in each of the diameter enlarged portions 54, the diameter increases linearly from the small-diameter portion 53 toward the large-diameter portion 52. For example, in the state in which the elastic cylindrical portion 51 has the natural length, the inclination of the diameter enlarged portion 54 (the inclination from the axis direction) is smaller than 45 degrees, and in the state in which the elastic cylindrical portion 51 is compression-deformed, the inclination of the diameter enlarged portion 54 can be increased to an angle larger than 45 degrees. Also, in this example, in the state in which the elastic cylindrical portion 51 has the natural length, the diameter enlarged portions 54 are longer than the large-diameter portions 52 and the small-diameter portions 53. The large-diameter portions 52 have the same diameter, and are hardly continuous in the lengthwise direction. Likewise, the small-diameter portions 53 have the same diameter, and are hardly continuous in the lengthwise direction.

In a state in which the elastic cylindrical portion 51 is compression-deformed while the other end portion of the cover member 50 is in contact with the outer armor member 40, the length dimension and the amount of compression deformation of the elastic cylindrical portion 51 are set to such a length dimension that the portions at one end of each of the electric wires 22 can extend from one end portion of the cover member 50 by a predetermined amount. The predetermined amount by which the electric wires 22 extend can be set as appropriate according to processing that is performed on the portions at one end of each of the electric wires 22 after the cover member 50 has been attached. In the case where the processing that is performed on the portions at one end of each of the electric wires 22 after the cover member 50 has been attached includes a process of pressure bonding the terminals T to the electric wire 22 and a process of inserting the terminals T into the connector housing 30, for example, the predetermined amount by which the electric wires 22 extend may be about 40 millimeters to about 60 millimeters. At this time, when leading ends of the electric wires 22 and a leading end of the cover member 50 are located at the same position while the other end portion of the cover member 50 with the natural length is in contact with the outer armor member 40, the elastic cylindrical portion 51 needs to be compression-deformable by at least about 40 millimeters to 60 millimeters.

The cylindrical holding portion 55 is a portion that is less likely to be compression-deformed than the elastic cylindrical portion 51. The cylindrical holding portion 55 is provided at a position adjacent to the elastic cylindrical portion 51 on the outer armor member 40 side. The proximal end portion of the cylindrical holding portion 55 on the elastic cylindrical portion 51 side continuously has the same diameter as that of the elastic cylindrical portion 51. The outer diameter and the inner diameter at the proximal end portion of the cylindrical holding portion 55 are about the same as the diameter of the small-diameter portions 53. A rib 56 is formed at the outer surface of a leading end portion of the cylindrical holding portion 55. The rib 56 extends annularly toward the outer circumferential side of the cylindrical holding portion 55. Accordingly, the outer diameter of the leading end portion of the cylindrical holding portion 55 is large. The inner diameter of the leading end portion of the cylindrical holding portion 55 is the same as the inner diameter of the proximal end portion of the cylindrical holding portion 55. With this configuration, the leading end portion of the cylindrical holding portion 55 is thicker than the proximal end portion of the cylindrical holding portion 55, and thus the rigidity is increased. In this example, the outer diameter of the rib 56 is equal to or smaller than the outer diameter of the ribs 42. With this configuration, the rear end face 61 of the cylindrical holding portion 55 can entirely come into contact with the front end face 43 of the outer armor member 40.

The length dimension of the cylindrical holding portion 55 may be any length dimension. In this example, in the state in which the cover member 50 has the natural length, the elastic cylindrical portion 51 has a length (dimension D1 shown in FIG. 3) longer than the length of the cylindrical holding portion 55 (dimension D2 shown in FIG. 3). With this configuration, the amount of compression deformation of the elastic cylindrical portion 51 can be increased. For example, in the state in which the elastic cylindrical portion 51 has the natural length, the cylindrical holding portion 55 is longer than a spacing between two large-diameter portions 52 that are provided continuously in the lengthwise direction. Also, for example, in the state in which the elastic cylindrical portion 51 has the natural length, the cylindrical holding portion 55 is shorter than a spacing between two outer large-diameter portions 52 out of three large-diameter portions 52 that are provided continuously in the lengthwise direction. Also, even in a state in which, for example, the elastic cylindrical portion 51 is compressed to the maximum extent possible by an operator within the range in which the elastic cylindrical portion 51 can be compressed, the length of the elastic cylindrical portion 51 is longer than that of the cylindrical holding portion 55.

The annular protruding portion 57 protrudes from the inner surface of the cylindrical holding portion 55 toward the linear transmission member 20. The annular protruding portion 57 is provided at an intermediate portion in the axis direction of the cylindrical holding portion 55. A plurality of (two in this example) annular protruding portions 57 are provided spaced apart from each other in the axis direction the cylindrical holding portion 55. Only one annular protruding portion 57 may be provided. The annular protruding portions 57 are in contact with the outer circumferential portion of the linear transmission member 20. The annular protruding portions 57 are in contact with the entire linear transmission member 20 in the circumferential direction. The inner surface of each annular protruding portion 57 has an annular (in this example, circular) cross section.

At the position where the annular protruding portions 57 are provided, the outer surface of the plurality of electric wires 22 is covered with an annular (circular in this example) protective portion 26. With this configuration, the outer surface of the protective portion 26 is smooth as compared with the exposed portions of the plurality of electric wires 22, and thus a gap is unlikely to be formed between the annular protruding portions 57 and the protective portion 26. In this example, the sheath 26 functions as the protective portion 26. Of course, the protective portion 26 is not limited to the sheath 26. For example, a portion of the fixing member attachment portion 40 may be extended toward the connector housing 30, and the extended portion may be used as the protective portion 26.

The outer diameter of the protective portion 26 is smaller than the inner diameter of the cylindrical holding portion 55. For this reason, the outer surface of the protective portion 26 and the inner surface of the cylindrical holding portion 55 at least partially oppose each other with a gap therebetween. The annular protruding portions 57 are in contact with the outer surface of the protective portion 26. The inner surfaces of the annular protruding portions 57 are in contact with the outer surface of the protective portion 26 in the circumferential direction. The inner diameter of the annular protruding portions 57 is equal to or smaller than the outer diameter of the protective portion 26. In the case where the inner diameter of the annular protruding portions 57 is smaller than the outer diameter of the protective portion 26, the annular protruding portions 57 are elastically deformed by the protective portion 26 to extend toward the outer circumferential side. With this configuration, a gap is unlikely to be formed between the annular protruding portions 57 and the protective portion 26.

The connector cover portion 58 is provided at a position adjacent to the elastic cylindrical portion 51 on the connector housing 30 side. The connector cover portion 58 covers a portion of the connector housing 30 including a rear end portion of the connector housing 30. In this example, the connector cover portion 58 covers a portion of the connector housing 30 from the rear end portion to an intermediate portion of the connector housing 30. The connector cover portion 58 may cover a portion of the connector housing 30 from the rear end portion to a leading end portion of the connector housing 30. The connector cover portion 58 is formed in, for example, a prismatic shape that conforms to the outer shape of the connector housing 30. A through hole is formed in a proximal end portion 59 of the connector cover portion 58 on the elastic cylindrical portion 51 side. With this configuration, the connector cover portion 58 and the elastic cylindrical portion 51 are in communication with each other. The through hole is smaller than the rear end face 31 of the connector housing 30. For example, one of the small-diameter portions 53 of the elastic cylindrical portion 51 or a portion in the vicinity thereof is connected to the connector cover portion 58. The diameter of the through hole is about the same as the inner diameter of the one of the small-diameter portions 53 of the elastic cylindrical portion 51 or the portion in the vicinity thereof.

Figure 3:
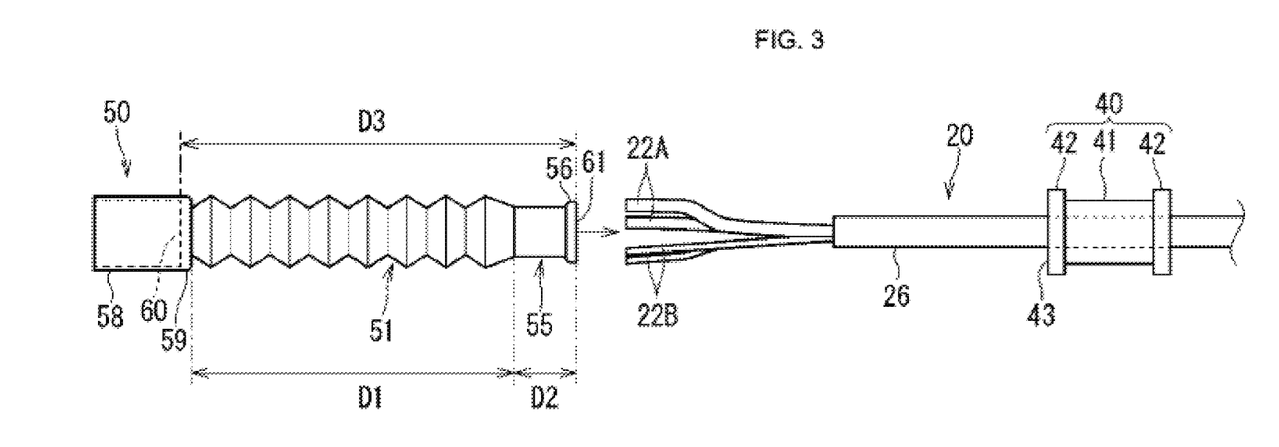
FIG. 3 is an illustrative diagram showing how the wiring member according to Embodiment 1 is produced.

A first contact portion 60 is provided at one end portion of the cover member 50 (see FIG. 3). A connector housing-side contact portion 31 is provided in the connector housing 30. When the cover member 50 moves toward the connector housing 30 in the lengthwise direction of the electric wires 22, the first contact portion 60 comes into contact with the connector housing-side contact portion 31 and restricts the movement of the cover member 50. In this example, the first contact portion 60 is a surface of the proximal end portion 59 of the connector cover portion 58 that faces a front end portion of the connector housing 30. The first contact portion 60 is a circumferential portion of the through hole formed in the proximal end portion 59 of the connector cover portion 58, and is located within the connector cover portion 58. Also, the connector housing-side contact portion 31 is the rear end face 31 of the connector housing 30.

A second contact portion 61 is provided at the other end portion of the cover member 50. An outer armor member-side contact portion 43 is provided to the outer armor member 40. When the cover member 50 moves toward the outer armor member 40 in the lengthwise direction of the electric wires 22, the second contact portion 61 comes into contact with the outer armor member-side contact portion 43 and restricts the movement of the cover member 50. In this example, the second contact portion 61 is the rear end face 61 of the cylindrical holding portion 55, and is a surface that faces the outer armor member 40. Also, the outer armor member-side contact portion 43 is the front end face 43 of the outer armor member 40, and is a surface that faces the cover member 50.

The elastic cylindrical portion 51 is provided between the first contact portion 60 and the second contact portion 61. The cover member 50 is compression-deformable between the first contact portion 60 and the second contact portion 61. The length of elastic cylindrical portion 51 from the first contact portion 60 to the second contact portion 61 is shortened as a result of the elastic cylindrical portion 51 being compression-deformed. In the cover member 50, the length from the first contact portion 60 to the second contact portion 61 is variable. The natural length of the cover member 50 from the first contact portion 60 to the second contact portion 61 (dimension D3 shown in FIG. 3) is equal to or longer than the length from the connector housing-side contact portion 31 to the outer armor member-side contact portion 43 (dimension D4 shown in FIG. 5). As used herein, the expression "the natural length of the cover member 50 from the first contact portion 60 to the second contact portion 61 is equal to the length from the connector housing-side contact portion 31 to the outer armor member-side contact portion 43" encompasses not only the case where the natural length of the cover member 50 is exactly equal to the length from the connector housing-side contact portion 31 to the outer armor member-side contact portion 43, but also the case where the natural length of the cover member 50 is slightly shorter than the length from the connector housing-side contact portion 31 to the outer armor member-side contact portion 43. That is, the expression encompasses, not only the case where both a pair of the first contact portion 60 and the connector housing-side contact portion 31 in the cover member 50 and a pair of the second contact portion 61 and the outer armor member-side contact portion 43 are in contact with each other, but also the case where either one of the two pairs are in contact with each other, and the other pair are slightly spaced apart from each other without being in contact with each other.

Figure 5:
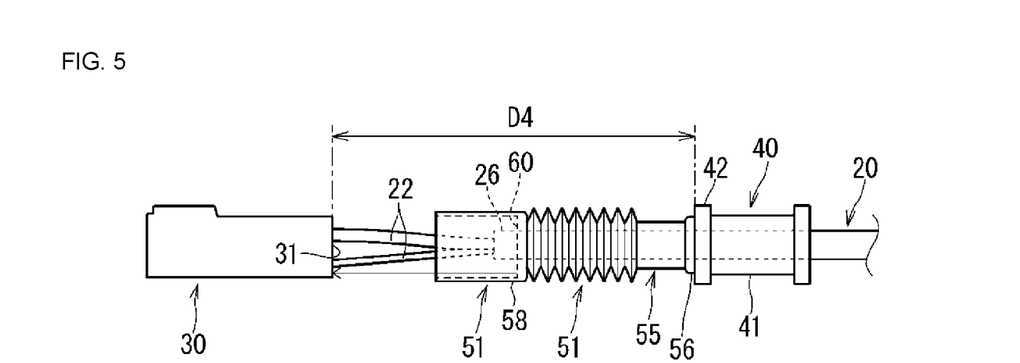
FIG. 5 is an illustrative diagram showing how the wiring member according to Embodiment 1 is produced.

In this example, the natural length of the cover member 50 from the first contact portion 60 to the second contact portion 61 (dimension D3 shown in FIG. 3) is longer than the length from the connector housing-side contact portion 31 to the outer armor member-side contact portion 43 (dimension D4 shown in FIG. 5). For this reason, the restoration of the elastic cylindrical portion 51 is restricted as a result of the elastic cylindrical portion 51 being compression-deformed to cause the first contact portion 60 and the connector housing-side contact portion 31 to come into contact with each other, and the second contact portion 61 and the outer armor member-side contact portion 43 to come into contact with each other. At this time, a restoring force of the cover member 50 is applied to the connector housing-side contact portion 31 and the outer armor member-side contact portion 43, and a counter force of the restoring force is applied to the cover member 50.

Figure 4:
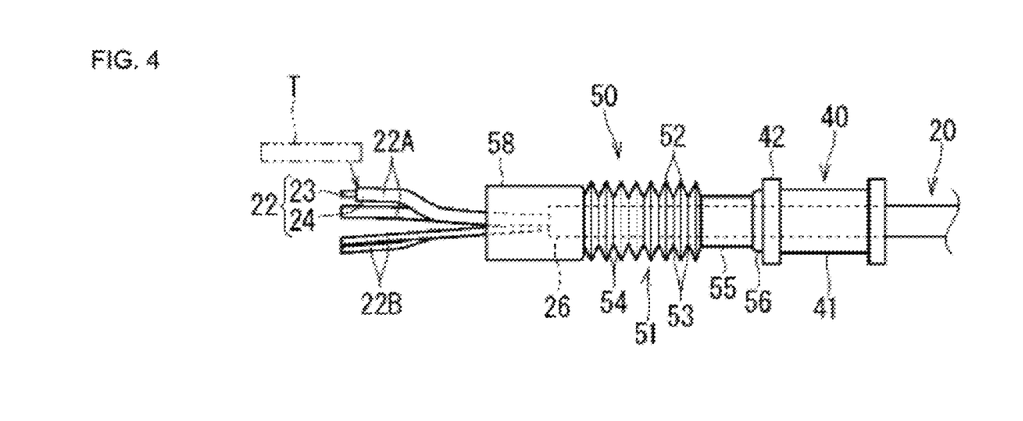
FIG. 4 is an illustrative diagram showing how the wiring member according to Embodiment 1 is produced.

The end portion of the sheath 26 is located within the cover member 50. In the state in which the cover member 50 has the natural length, the end portion of the sheath 26 may be located within the cover member 50, and may be located at any position within the cover member 50. For example, in the state in which the cover member 50 has the natural length, the end portion of the sheath 26 may be located within the elastic cylindrical portion 51. In this case, as shown in FIG. 4, when the elastic cylindrical portion 51 is compression-deformed while the second contact portion 61 of the cover member 50 is in contact with the outer armor member-side contact portion 43, the end portion of the sheath 26 may remain within the elastic cylindrical portion 51, may be located within the connector cover portion 58, or may extend from the end portion of the cover member 50. Preferably, in the state in which the cover member 50 has the natural length, the end portion of the sheath 26 may be located on the connector housing 30 side relative to the annular protruding portion 57. With this configuration, the annular protruding portions 57 can come into contact with the sheath 26.

Production Method

An example of a method for producing the wiring member 10 will be described with reference to FIGS. 3 to 5. FIGS. 3 to 5 are illustrative diagrams showing how the wiring member 10 according to Embodiment 1 is produced.

First, the linear transmission member 20 is passed through the cover member 50. At this time, as shown in FIG. 3, a leading end portion of the linear transmission member 20 to which the outer armor member 40 has been fixed in advance may be passed through the cover member 50. In this example, as the outer armor member 40, the fixing member attachment portion 40 is fixed to the outer circumferential portion of the sheath 26. For example, the fixing member attachment portion 40 is insert-molded using the linear transmission member 20 as an insert component, and fixed to the outer circumferential portion of the sheath 26. Then, the linear transmission member 20 is passed through the cover member 50. At this time, when the cover member 50 is inserted, the second contact portion 61 of the cover member 50 eventually abuts against the outer armor member-side contact portion 43 of the outer armor member 40, which prevents the cover member 50 from being excessively inserted. In the example shown in FIG. 3, the linear transmission member 20 is passed through the cover member 50, with a leading end portion of the sheath 26 being stripped off. However, the leading end portion of the sheath 26 may be stripped off after the linear transmission member 20 has been passed through the cover member 50.

Next, the end portions of the electric wires 22 are subjected to processing. At this time, as shown in FIG. 4, the cover member 50 is compression-deformed, and thus the end portions of the electric wires 22 extend outward from the cover member 50 by a predetermined length. The state in which the cover member 50 is compression-deformed is maintained, and the end portions of the electric wires 22 extending outward from the cover member 50 are subjected to processing. The processing performed on the end portions of the electric wires 22 may include a process of attaching the terminals T and a process of inserting the terminals T. The process of attaching the terminals T is the processing of providing the terminals T to the end portions of the electric wires 22. For example, the terminals T may be pressure bonded to the end portions of the electric wires 22, or the terminals T may be press-contacted or welded to the end portions of the electric wires 22. In the case where the terminals T are pressure bonded, the terminals T may be pressure bonded after the coatings 24 have been stripped off from the end portions of the electric wires 22. The process of inserting the terminals T is the processing of inserting the terminals T that have been connected to the end portions of the electric wires 22 into the cavity of the connector housing 30.

When all of the terminals T of the electric wires 22 have been inserted into the cavity of the connector housing 30, a state shown in FIG. 5 is obtained. After that, the compression-deformation of the cover member 50 is released, and the elastic cylindrical portion 51 elastically restores and extends. As a result, the connector cover portion 58 covers the rear end portion of the connector housing 30, and the wiring member 10 shown in FIG. 1 is obtained. At this time, the first contact portion 60 of the cover member 50 is in contact with the connector housing-side contact portion 31.

Advantageous Effects and the Like of Embodiment 1

With the wiring member 10 configured as described above, the cover member 50 and the linear transmission member 20 are relatively movable in the lengthwise direction of the electric wires 22, and, at the same time, the connector housing 30 and the outer armor member 40 restrict the movement of the cover member 50 in the lengthwise direction of the electric wires 22. Accordingly, the state in which the cover member 50 is attached to a predetermined position can be maintained without winding a tape. Also, the cover member 50 is an elastic member, and includes an elastic cylindrical portion 51 that is compression-deformable in the lengthwise direction, and thus even after the cover member 50 has been attached to the electric wires 22, the elastic cylindrical portion 51 can be compression-deformed, and thus the end portions of the electric wires 22 can be easily processed.

Also, the natural length of the cover member 50 that extends from the first contact portion 60 to the second contact portion 61 (dimension D3 shown in FIG. 3) is equal to or longer than the length from the connector housing-side contact portion 31 to the outer armor member-side contact portion 43 (dimension D4 shown in FIG. 5). With this configuration, the cover member 50 hardly moves in the lengthwise direction of the electric wire 22. In particular, the natural length of the cover member 50 from the first contact portion 60 to the second contact portion 61 (dimension D3 shown in FIG. 3) is longer than the length from the connector housing-side contact portion 31 to the outer armor member-side contact portion 43 (dimension D4 shown in FIG. 5). With this configuration, opposite end portions of the cover member 50 are pressed by the connector housing 30 and the outer armor member 40, and thus the cover member 50 is unlikely to rattle.

Also, in the state in which the elastic cylindrical portion 51 is compression-deformed, the diameter enlarged portions 54 are inclined at a higher angle, and adjacent large-diameter portions 52 come closer to each other. With this configuration, the shape of the elastic cylindrical portion 51 can be easily compression-deformed.

Also, the cylindrical holding portion 55 is provided at a position adjacent to the elastic cylindrical portion 51 on the outer armor member 40 side. With this configuration, the cover member 50 and the outer armor member 40 are likely to come into contact with each other in an appropriate orientation.

Also, in the state in which the cover member 50 has the natural length, the length of the elastic cylindrical portion 51 (dimension D1 shown in FIG. 3) is longer than the length of the cylindrical holding portion 55 (dimension D2 shown in FIG. 3). With this configuration, the length of the elastic cylindrical portion 51 that is compression-deformable can be extended.

Also, the annular protruding portions 57 are in contact with the outer circumferential portion of the linear transmission member 20. With this configuration, it is possible to prevent water and the like from entering between the cylindrical holding portion 55 and the linear transmission member 20. Also, the annular protruding portions 57 are in contact with the outer surface of the protective portion 26. With this configuration, a gap is unlikely to be formed between the annular protruding portions 57 and the outer surface of the annular protective portion 26.

Also, the end portion of the sheath 26 is located within the cover member 50. With this configuration, portions of the plurality of electric wires 22 that are not covered with the sheath 26 are covered with the cover member 50. Also, the end portion of the cover member 50 on the outer armor member 40 side is located in a portion where the sheath 26 is provided.

Variations

In the description given above, a configuration has been described in which the cover member 50 includes the cylindrical holding portion 55, but this configuration is not essential. For example, in the cover member 50, the cylindrical holding portion 55 may be omitted, and the elastic cylindrical portion 51 may extend to the other end portion of the cover member 50.

Also, in the description given above, a configuration has been described in which the cover member 50 includes the annular protruding portions 57, but this configuration is not essential. For example, the cover member 50 does not necessarily need to include the annular protruding portions 57. In this case, there may be a gap between the cylindrical holding portion 55 and the linear transmission member 20. Also, the cylindrical holding portion 55 may be in contact with the linear transmission member 20 over the entire circumference thereof.

Also, in the description given above, a configuration has been described in which the annular protruding portions 57 are in contact with the protective portion 26, but this configuration is not essential. For example, the annular protruding portions 57 may be in contact with the plurality of electric wires 22.

Also, in the description given above, a configuration has been described in which the linear transmission member 20 includes the sheath 26 that covers the plurality of electric wires 22, but this configuration is not essential. The linear transmission member 20 does not necessarily need to include the sheath 26. In this case, the plurality of electric wires 22 may be bundled with a pressure sensitive tape, or the plurality of electric wires 22 may not be bundled. Also, even in the case where the linear transmission member 20 includes the sheath 26 that covers the plurality of electric wires 22, the configuration in which the end portion of the sheath 26 is located within the cover member 50 is not essential. For example, the end portion of the sheath 26 may be located within the branch maintaining portion that serves as the outer armor member.

The structural elements in the embodiment and the variations described above may be combined as appropriate unless they are contradictory to each other.

The invention claimed is:
1. A wiring member comprising:
a linear transmission member that includes an electric wire;
a connector housing in which an end portion of the electric wire in a lengthwise direction of the electric wire is housed;
an outer armor member that is provided in an intermediate portion in the lengthwise direction of the electric wire, and fixed to an outer circumferential portion of the linear transmission member, the outer armor member including a first rib; and
a cover member that is provided between the connector housing and the outer armor member in the lengthwise direction of the electric wire, and concentric to the outer circumferential portion of the linear transmission member, the cover member further includes a cylindrical holding portion, a connector cover portion and an elastic cylindrical portion, the elastic cylindrical portion interposed between the cylindrical holding portion and the connector cover portion, the cylindrical holding portion includes a second rib abutting against the first rib of the outer armor member;
wherein the cover member is relatively movable in the lengthwise direction of the electric wire, and the connector housing and the outer armor member restrict a movement of the cover member in the lengthwise direction of the electric wire when the electric wire is attached to the connector housing, and
the cover member is an elastic member, and includes the elastic cylindrical portion that is compression-deformable in a lengthwise direction of the cover member, the cylindrical holding portion is configured to be detachably mounted onto an outer surface of the connector housing.

2. The wiring member according to claim 1,
wherein, when the cover member moves toward the connector housing in the lengthwise direction of the electric wire, a first contact portion that is provided at one end portion of the cover member comes into contact with a connector housing-side contact portion of the connector housing and restricts the movement of the cover member, and when the cover member moves toward the outer armor member in the lengthwise direction of the electric wire, a second contact portion that is provided at the other end portion of the cover member comes into contact with an outer armor member-side contact portion of the outer armor member and restricts the movement of the cover member, and
a natural length of the cover member from the first contact portion to the second contact portion is equal to or longer than a length from the connector housing-side contact portion to the outer armor member-side contact portion.

3. The wiring member according to claim 2,
wherein the natural length of the cover member from the first contact portion to the second contact portion is longer than the length from the connector housing-side contact portion to the outer armor member-side contact portion.

4. The wiring member according to any claim 1,
wherein the elastic cylindrical portion is formed in a bellows shape in which large-diameter portions and small-diameter portions are alternately provided in a continuous manner in the lengthwise direction.

5. The wiring member according to claim 1,
wherein the cylindrical holding portion is less likely to be compression-deformed than the elastic cylindrical portion.

6. The wiring member according to claim 5,
wherein, when the cover member is in a natural length state, the elastic cylindrical portion is longer than the cylindrical holding portion.

7. The wiring member according to claim 5,
wherein the cover member further includes an annular protruding portion that protrudes from an inner surface of the cylindrical holding portion toward the linear transmission member, and
the annular protruding portion is in contact with the outer circumferential portion of the linear transmission member.

8. The wiring member according to claim 7,
wherein the linear transmission member includes a plurality of electric wires including the electric wire,
at a position where the annular protruding portion is provided, the plurality of electric wires are covered with a protective portion that has an annular outer surface, and
the annular protruding portion is in contact with the outer surface of the protective portion.

9. The wiring member according to claim 1,
wherein the linear transmission member includes a plurality of electric wires including the electric wire and a sheath that covers the plurality of electric wires,
portions of the plurality of electric wires including end portions of the plurality of electric wires that are housed in the connector housing extend from an end portion of the sheath, and
the end portion of the sheath is located within the cover member.

10. The wiring member according to claim 2,
wherein the elastic cylindrical portion is formed in a bellows shape in which large-diameter portions and small-diameter portions are alternately provided in a continuous manner in the lengthwise direction.

11. The wiring member according to claim 3,
wherein the elastic cylindrical portion is formed in a bellows shape in which large-diameter portions and small-diameter portions are alternately provided in a continuous manner in the lengthwise direction.

12. The wiring member according to claim 2,
wherein the cylindrical holding portion is less likely to be compression-deformed than the elastic cylindrical portion.

13. The wiring member according to claim 3,
wherein the cylindrical holding portion is less likely to be compression-deformed than the elastic cylindrical portion.

14. The wiring member according to claim 4,
wherein the cylindrical holding portion is less likely to be compression-deformed than the elastic cylindrical portion.

15. The wiring member according to claim 6,
wherein the cover member further includes an annular protruding portion that protrudes from an inner surface of the cylindrical holding portion toward the linear transmission member, and
the annular protruding portion is in contact with the outer circumferential portion of the linear transmission member.

16. The wiring member according to claim 2,
wherein the linear transmission member includes a plurality of electric wires including the electric wire and a sheath that covers the plurality of electric wires,
portions of the plurality of electric wires including end portions of the plurality of electric wires that are housed in the connector housing extend from an end portion of the sheath, and
the end portion of the sheath is located within the cover member.

17. The wiring member according to claim 3,
wherein the linear transmission member includes a plurality of electric wires including the electric wire and a sheath that covers the plurality of electric wires,
portions of the plurality of electric wires including end portions of the plurality of electric wires that are housed in the connector housing extend from an end portion of the sheath, and
the end portion of the sheath is located within the cover member.

18. The wiring member according to claim 4,
wherein the linear transmission member includes a plurality of electric wires including the electric wire and a sheath that covers the plurality of electric wires,
portions of the plurality of electric wires including end portions of the plurality of electric wires that are housed in the connector housing extend from an end portion of the sheath, and
the end portion of the sheath is located within the cover member.

19. The wiring member according to claim 5,
wherein the linear transmission member includes a plurality of electric wires including the electric wire and a sheath that covers the plurality of electric wires,
portions of the plurality of electric wires including end portions of the plurality of electric wires that are housed in the connector housing extend from an end portion of the sheath, and
the end portion of the sheath is located within the cover member.

20. The wiring member according to claim 6,
wherein the linear transmission member includes a plurality of electric wires including the electric wire and a sheath that covers the plurality of electric wires,
portions of the plurality of electric wires including end portions of the plurality of electric wires that are housed in the connector housing extend from an end portion of the sheath, and
the end portion of the sheath is located within the cover member.

\* \* \* \* \*